Figure 2:
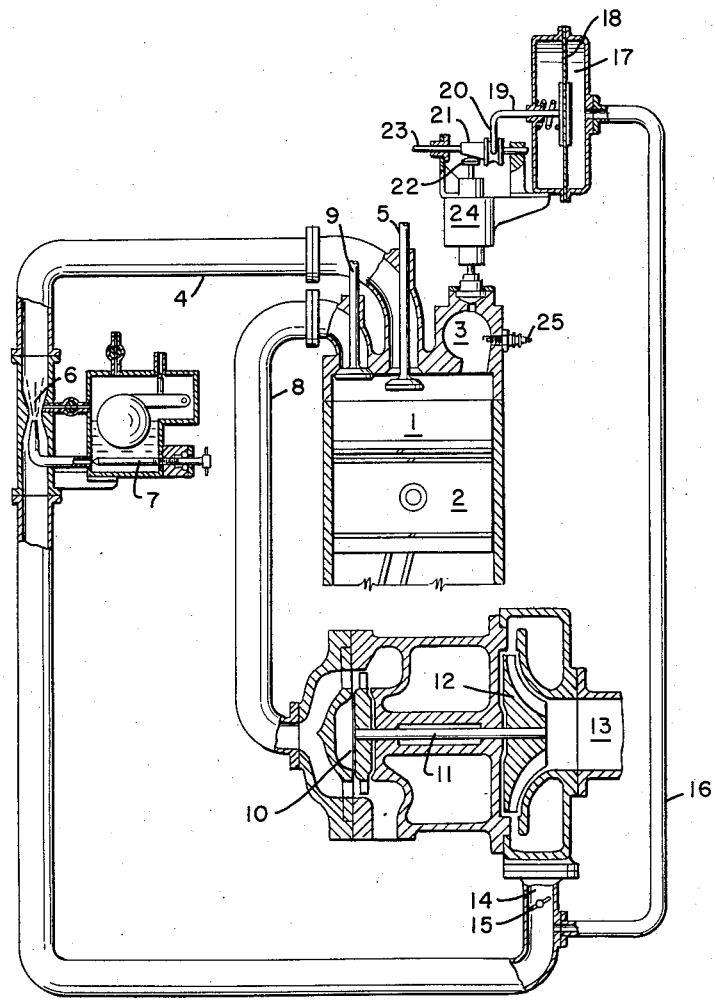

Sept. 2, 1958 C. STILLEBROER ET AL 2,849,992
STRATIFIED CHARGE INTERNAL COMBUSTION ENGINE
Filed Dec. 15, 1955

INVENTORS
CORNELIS STILLEBROER
JOHANNES T.M. SCHLAMANN
BY *H. D. Birch*
THEIR ATTORNEY United States Patent Office 2,849,992
Patented Sept. 2, 1958

2,849,992

STRATIFIED CHARGE INTERNAL COMBUSTION ENGINE

Cornelis Stillebroer and Johannes T. M. Schlamann, Delft, Netherlands, assignors to Shell Development Company, New York, N. Y., a corporation of Delaware Application December 15, 1955, Serial No. 553,353

Claims priority, application Netherlands December 24, 1954

2 Claims. (Cl. 123—32)

The invention relates to a mixture-compressing internal combustion engine with a prechamber, in which in said prechamber, which is provided with an ignition device, a rich fuel-air mixture is formed and a weak fuel-air mixture is directly supplied to the cylinder chamber.

Further details of the type of engine to which the reference is made and with which our invention is concerned are set forth in U. S. Patent 2,758,576 granted August 14, 1956, and based upon an invention of Johannes T. M. Schlamann.

The advantage of an engine of this type is that the danger of detonation is extremely small, while in operating such an engine it has been found that the temperature in the combustion chamber and of the exhaust gases is relatively low as a result of the manner in which the combustion process takes place in the cylinder.

If it is desired to increase the power of an internal combustion engine to beyond the normal load area thereof, this is possible in diesel engines by increasing the charge with the use of, for example, a compressor driven by the engine, which compressor supplies the air under pressure to the combustion chamber.

In mixture-compressing engines this so-called "supercharging" has been found to be infeasible in practice without taking special measures, e. g., choosing fuels with very high anti-knock properties, injection of alcohol and/or water into the cylinder as done, for example, in the case of aero-engines. If such provisions are omitted, this always gives rise to detonation at the maximum load, inter alia as a result of the temperatures in the combustion chamber rising to far too great an extent. Since, as already mentioned, the danger of detonation in engines of the type described in the preamble is extremely slight, the possibility exists in such cases of applying supercharging on a far more extensive scale.

The invention comprises in using in an engine of the type described a compressor for supplying air under pressure to the combustion chamber, the rich fuel-air mixture formed in the prechamber being kept at a practically constant mixture strength over substantially the whole load area.

The latter is important for ensuring that the conditions for ignition remain favourable notwithstanding the greatly varying quantities of air in the prechamber as a result of supercharging to different degrees.

It is possible in this case to use an exhaust gas turbine for operating the compressor and thus using for this purpose the energy of the exhaust gases since, as already stated, the temperature of these gases in such an engine is relatively low. The requirements made in this case of the material of which the turbine is constructed are consequently not so high.

The advantage of the method described above is that when the power is equal the temperatures in the engine will be lower than if no air were supplied under pressure, that the fuel consumption will be more favourable and that a fuel with a lower octane number can be used for the same power as when the engine were operated without supercharging. A greater power can, of course, be reached, as is always the case when supercharging, but the object of the invention is not only to apply supercharging at full load but in the whole load area of the engine, which will, moreover, be clear from the advantages stated above.

The said method is particularly suitable for four-stroke engines, although it can also be applied to engines of the two-stroke type, particularly to engines with two pistons moving reciprocally to each other in the same cylinder.

A particular advantage is that it is now easier to use an exhaust gas turbine in mixture-compressing engines so that the energy still present in the exhaust gases can be further utilized without loss of power for the engine; when using a compressor operated by the engine shaft a part of the useful power of the engine is required for the purpose. A further advantage is the possibility of placing the turbine-compressor aggregate freely with respect to the engine, which is not the case to the same extent when using a compressor coupled to the engine shaft owing to its dependence on the transmission mechanism.

The method according to the invention may be carried out in various ways, particularly with respect to the formation of the rich mixture in the prechamber.

Thus the air may be supplied to the engine solely via the inlet of the cylinder space, the rich mixture being formed in the prechamber by injecting a variable quantity of liquid fuel into this prechamber during the first half of the compression stroke, depending on the density or pressure of the air supplied to the cylinder space.

According to the invention air under pressure may also be supplied both at an inlet of the cylinder and an inlet of the prechamber, a quantity of fuel being supplied to the latter air by means of a carburettor which approximately corresponds to the amount of air supplied to the prechamber.

An engine of the type referred to in the preamble can be made suitable for carrying out the above method by providing it with a compressor for supplying compressed air to the engine and with a device for keeping the rich fuel-air mixture formed in the prechamber at a constant mixture strength over substantially the whole load area. The various parts of the installation, viz. engine, compressor and, any turbine, if present, are connected by means of suitable lines in which control members are fitted, all dependent upon the manner in which the said method is carried out.

The quantity of air to be supplied to the engine can be controlled either by providing the compressor with a throttling element on the inlet side, or by arranging a blow-off valve in the exhaust line of the compressor, so that the air can be either throttled or partly blown off. If the rich mixture in the prechamber is formed by injecting fuel therein, the engine should be provided with a device for controlling the quantity of fuel injected into the prechamber according to the density or pressure of the air supplied by the compressor to the cylinder; in this way it is possible to ensure that the rich mixture formed in the prechamber is kept at a constant composition during substantially the whole of the load area.

A device of this type may, for example, consist of a mechanism formed by a diaphragm or the like, one side of which is acted on by the pressure of the air to be supplied to the engine, and to which a rod or the like is connected which moves together with the diaphragm and the displacement of which is transmitted to a sliding cam; this cam, which drives the fuel pump, varies in height along its length, so that when the cam is adjusted the stroke length of the pump is modified.

If the rich mixture in the prechamber is formed by supplying a part of the supercharging air directly to this prechamber and providing the supply line with a carburettor, the air supply to the engine is controlled in the manner explained above, while a distributing valve or the like may be incorporated behind the compressor with a control member in the compressed-air line for distributing over the cylinder space and the prechamber the total quantity of air intended for the engine.

Figure 1:
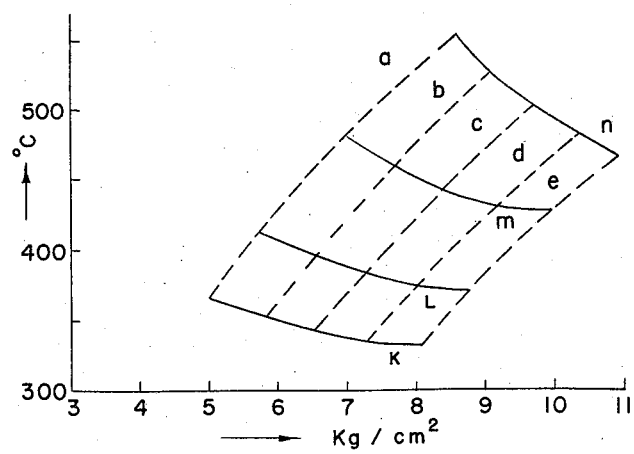

The invention will be further illustrated by means of the drawing in which:

Figure 1 is a graph showing the relation between exhaust temperature on the one hand and cylinder pressure on the other hand with the different supercharging pressures and fuels used, and Figure 2 is a vertical sectional view of an engine according to the invention.

In Figure 1 the exhaust temperature for a particular engine is plotted in °C. on the vertical axis, and the average effective cylinder pressure in kg./sq. cm. on the horizontal axis, this being a measure of the power generated by the engine. The lines $a$ to $e$ in the graph are lines of constant inlet pressure of $-15$, 100, 200, 300 and 400 mm. Hg, respectively, and the lines $k$, $l$, $m$ and $n$ are fuel lines, i. e., they represent the minimum octane number at a given exhaust temperature and average effective cylinder pressure required for the fuel to prevent detonation (in this example 60, 70, 80 and 90, respectively). It can immediately be seen from the figure that as supercharging increases, the exhaust temperature drops when a constant power is produced, and that at the same time the demands made on the fuel are lower according as there is more supercharging. Vice versa, when starting from a given permissible exhaust temperature, the power to be obtained is greater as supercharging is higher. The lower the exhaust temperature the more favourable are the material requirements for an exhaust gas turbine and for the lines.

The graph is derived from a series of tests carried out with a four-cyliner engine with a 120-mm. stroke, a cylinder diameter of 100 mm., a compresison ratio of 8.6:1 and 1400 revolutions per minute.

Figure 2 is a diagram of an engine according to the invention in which, by way of example, an engine is chosen with injection of fuel in the prechamber. The motor comprises a cylinder 1, which is also the main combustion chamber, in which the piston 2 moves, and a prechamber 3. A carburettor 6 provided with a control member 7 for varying the fuel supply is arranged in inlet line 4 provided with inlet valve 5, by means of which carburettor the weak mixture to be supplied to the main combustion chamber 1 is formed. After the exhaust valve 9 the exhaust line 8 is connected to the inlet side of gas turbine 10 which is coupled to compressor 12 by means of the common shaft 11. Compressor 12 sucks the air via inlet line 13 and supplies air under pressure; the exhaust line 14 of the compressor, which line is provided with a control member 15, communicates with the inlet line 4 of the engine. The line 14 has a branch 16 behind the control member 15, which branch forms a connection to the box 17, provided with a spring-loaded diaphragm 18. This diaphragm can displace as a result of changes of pressure in the air which operates on this diaphragm on one side and the displacement thereof is transmitted via the rod 19 and fork 20 to the sliding cam 21 which operates the plunger 22 of the fuel pump 24. This cam is driven by the rotating cam-shaft 23 to which it is attached by means of a keyway. Prechamber 3 is also provided with a spark-plug 25.

The engine now operates as follows:

The exhaust gases leaving the engine cylinder via valve 9 and line 8 drive the turbine 10, which drives the compressor 12. The quantity and the pressure of the air to be supplied to the engine by the compressor is controlled via the compressor exhaust control member 15 in the exhaust line 14 thereof. If desired, instead of this control member a throttling element, for example, may also be arranged in the inlet line 13 of the compressor. Control may also be effected by means of a blow-off valve in the inlet line 8 of the turbine 10.

In order to keep constant the composition of the rich mixture in the prechamber 3, the quantity of fuel to be injected herein by the pump 24 should be adapted to the quantity of air supplied to the main combustion chamber. This is effected by the pressure of the air supplied by the compressor operating on diaphragm 18. As a result of the movement hereof caused by a change of pressure in the air and, consequently, of the quantity of air supplied to the combustion chamber, the cam 23 is moved via rod 19 and fork 20, which modifies the stroke of plunger 22 of the pump 24. When the pressure and amount of air is increased the stroke length of the pump plunger is also increased and thus the amount of fuel injected, and vice versa.

The mechanism may be provided with a stop or the like in order to ensure the injection of the minimum quantity of fuel in the prechamber, e. g., when there is no supercharging at all.

The invention is, of course, not restricted to the embodiment shown which, as already mentioned, is only given by way of example.

We claim as our invention:

1. In a spark ignition engine of the character described: a cylinder and piston defining a cylinder working space, a prechamber combustion space, means affording restricted communication between said spaces, a fuel injector for admitting a volume of volatile fuel to said precombustion space during the compression stroke of the piston, valve means adapted to control admission of a volume of volatile fuel-air mixture under superatmospheric pressure to the cylinder working space during the induction stroke, a carburetor for forming said fuel-air mixture connected to said cylinder working space through said valve means, a supercharger connected at its outlet to the air inlet of said carburetor, supercharger drive means, a fuel injector controller, a pipe connecting the outlet of said supercharger to said fuel injector controller, said fuel injector and said fuel injector controller being adapted to vary the volume of volatile fuel admitted by said fuel injector to said prechamber combustion space in accordance with variations in the air pressure at said supercharger outlet whereby the fuel to air ratio produced in said prechamber combustion space is maintained substantially constant under all load conditions.

2. A combination as set forth in claim 1 in which the fuel injector controller comprises a reciprocating plunger fuel pump, an axially slidable rotatable cam of variable height actuating said plunger upon rotation of said cam, and means responsive to the air pressure in said supercharger outlet for axially moving said cam.

References Cited in the file of this patent

UNITED STATES PATENTS

| | | |
|---|---|---|
| 1,616,157 | Werner | Feb. 1, 1927 |
| 1,816,737 | Moss | July 28, 1931 |
| 1,835,490 | Hesselman | Dec. 8, 1931 |
| 2,690,741 | Broderson | Oct. 5, 1954 |
| 2,758,576 | Schlamann | Aug. 14, 1956 |